United States Patent

Kawamura

[11] Patent Number: 5,943,859
[45] Date of Patent: Aug. 31, 1999

[54] NATURAL GAS REFORMING APPARATUS, OXYGEN ELIMINATING APPARATUS PROVIDED IN THE SAME APPARATUS, AND NATURAL GAS REFORMING APPARATUS-CARRYING GAS ENGINE

[75] Inventor: Hideo Kawamura, Kanagawa-ken, Japan

[73] Assignee: Isuzu Ceramics Research Institute Co., Ltd., Kanagawa-ken, Japan

[21] Appl. No.: 09/115,747

[22] Filed: Jul. 15, 1998

[30] Foreign Application Priority Data

Sep. 18, 1997 [JP] Japan ................................. 9-270389
Sep. 18, 1997 [JP] Japan ................................. 9-270390

[51] Int. Cl.⁶ ....................................................... F01N 3/02
[52] U.S. Cl. ........................... 60/320; 60/278; 60/279; 60/280; 60/303; 252/373; 48/197 R; 48/127.7; 48/198.1; 422/173
[58] Field of Search .................. 60/279, 278, 280, 60/320, 286, 303; 252/373; 48/197 R, 127.7, 127.3, 128; 422/168, 239; 55/DIG. 30, 385.3; 423/418.2

[56] References Cited

U.S. PATENT DOCUMENTS 3,993,459  11/1976  Koch et al. ............................. 48/212
4,185,966  1/1980  Frie et al. .............................. 48/212
4,519,342  5/1985  Yoon ....................................... 123/3
5,876,469  3/1999  Moriya et al. ...................... 48/197 R

FOREIGN PATENT DOCUMENTS 6-101495  4/1994  Japan .
6-108865  4/1994  Japan .

*Primary Examiner*—F. Daniel Lopez
*Assistant Examiner*—Binh Tran
*Attorney, Agent, or Firm*—Browdy and Neimark

[57] ABSTRACT

This invention provides a gas engine in which a natural gas reforming apparatus for thermally decomposing $CH_4$ in a natural gas into a reformed fuel of CO and $H_2$ is used to improve the thermal efficiency, $CO_2$ in an exhaust gas being used for the thermal decomposition operation to reduce the $CO_2$ content of the discharged exhaust gas and minimize the generation of NOx. An oxygen eliminating apparatus for removing $O_2$ from $CO_2$ separated from the exhaust gas can be provided in the natural gas reforming apparatus. In this natural gas reforming apparatus, a gas fuel case in which a gas fuel flows is provided on the outer side of an exhaust gas passage body in which the exhaust gas flows, and a surface of a porous member provided in the gas fuel case is coated with a catalyst. The oxygen eliminating apparatus comprises a porous carbon member provided in a $CO_2$ passage so as to subject $O_2$ in $CO_2$ and C to a reaction and convert the same substances into CO and $CO_2$, and a power source for electrically heating the porous carbon member.

13 Claims, 5 Drawing Sheets

NATURAL GAS REFORMING APPARATUS, OXYGEN ELIMINATING APPARATUS PROVIDED IN THE SAME APPARATUS, AND NATURAL GAS REFORMING APPARATUS-CARRYING GAS ENGINE

BACKGROUND OF THE INVENTION

1. Field of the Invention

This invention relates to a natural gas reforming apparatus adapted to reform a gas fuel, such as a natural gas as a fuel by the thermal energy of an exhaust gas, an oxygen eliminating apparatus provided in the natural gas reforming apparatus, and a gas engine adapted to improve a thermal efficiency by turning a gas fuel into a reformed fuel by the natural gas reforming apparatus.

2. Description of the Prior Art

The development of a gas engine, which uses a natural gas as a main fuel, as a cogeneration system has heretofore been promoted. In a cogeneration system, power is taken out as electric energy by a generator, and water is heated into hot water in a heat exchanger by the heat of exhaust gas energy, this hot water being utilized as hot water supply. The conventional engines using a natural gas as a fuel include, for example, the engines disclosed in Japanese Patent Laid-Open Nos. 108865/1994 and 101495/1994.

In the cogeneration type gas engine disclosed in Japanese Patent Laid-Open No. 108865/1994, the temperature of an exhaust gas is reduced by passing the exhaust gas through a turbocharger, an energy recovery unit and a steam generator, and the low-temperature exhaust gas is used for EGR to reduce NOx, the turbocharger being driven by the exhaust gas from the heat insulating gas engine, the generator-carrying energy recovery unit being driven by the exhaust gas from the turbocharger. In this cogeneration type gas engine, the exhaust gas from the energy recovery unit is sent to the steam generator in the heat exchanger, and water is turned into steam in the steam generator, a steam turbine being driven by the steam to recover the steam as electric energy.

When the combustion chambers in a gas engine using a natural as a fuel are formed to a heat insulating structure out of a material, such as a ceramic material, the compression temperature of the air increases higher than a self-ignition temperature of a natural gas, so that an igniter becomes unnecessary. An engine for a high-efficiency cogeneration system can be provided by providing swirl chambers, into which a fuel is introduced, in addition to primary chambers into which the air is introduced, providing control valves between the primary chambers and swirl chambers, and carrying out an operation of the engine by a diesel cycle. When the combustion chambers are formed to a heat insulating structure, the temperature of an exhaust gas from the gas engine becomes as high as not lower than 850° C. The thermal efficiency of the engine can be improved by recovering thermal energy from a high-temperature exhaust gas.

It is known that the main component of a natural gas is methane $CH_4$. Since $CH_4$ of a fuel has a high calorific value and exists in large quantities in the natural world, it is expected as a future substitute fuel for petroleum. When $CH_4$ is thermally decomposed in the presence of $CO_2$ via a catalyst, $CH_4$ is converted into CO (carbon monoxide) and $H_2$ (hydrogen), and a total calorific value of CO and $H_2$ becomes not lower than that of $CH_4$, i.e., 1.38 times that of $CH_4$. When a natural gas is then turned into a reformed fuel by utilizing the thermal energy of a high-temperature exhaust gas from a heat insulating gas engine for the thermal decomposition of $CH_4$, it becomes possible to increase the calorific value of the reformed fuel, improve the thermal efficiency of the engine, save the resources and minimize the discharge rate of $CO_2$.

However, when $O_2$ is contained in a $CO_2$-containing separated gas in a case where $CO_2$ separated from an exhaust gas is used in a natural gas reforming apparatus adapted to convert $CH_4$ in a natural gas into $H_2$ and CO by the thermal energy of the exhaust gas in the presence of $CO_2$, $O_2$ and $H_2$ and CO are reacted in a catalyst unit in the natural gas reforming apparatus, and there is a danger of occurrence of a reaction and explosion in a certain case. Therefore, it is necessary that $O_2$ contained in the $CO_2$-contained gas separated from an exhaust gas which is sent to the natural gas reforming apparatus be reduced to as great an extent as possible.

In general, the exhaust gas from a diesel engine contains about 75% of $N_2$, about 15% of $CO_2$ and about 10% of $O_2$ due to an excess air ratio but it does not always have such a content ratio, i.e., the exhaust gas contains more $O_2$ in some cases. When the exhaust gas is passed through a $CO_2$ separation film in a $CO_2$ separator, a $CO_2$-containing gas separated from the exhaust gas comes to contain about 90% of $CO_2$, about 8% of $N_2$ and about 2% of $O_2$. Even when a separated gas of this composition is sent to the natural gas reforming apparatus, not so big a problem arises in a usual case but, in some cases, a phenomenon in which such a separated gas contains not less than 5% of $O_2$ due to the abnormality in the component ratio of the exhaust gas or in the $CO_2$ separation film. Therefore, when a separated gas containing not less than 5% of $O_2$ is sent to the natural gas reforming apparatus, $H_2$ and CO occurring in the apparatus react with $O_2$ in the separated gas, and explosion occurs, i.e., the apparatus is put in a very dangerous condition.

SUMMARY OF THE INVENTION

An object of the present invention is to solve these problems, and provide a natural gas reforming apparatus adapted to convert a $CH_4$ gas, a main component of a natural gas into CO and $H_2$ with the help of a catalyst by utilizing the thermal energy of an exhaust gas and mixing $CO_2$ with $CH_4$, and a gas engine provided with such a natural gas reforming apparatus as mentioned above in the portion of an exhaust passage which is nearby an exhaust manifold or in a collecting pipe in the exhaust manifold, whereby it is rendered possible to secure $CO_2$, which is used when a gas fuel is converted into a reformed fuel, from an exhaust gas, which is discharged from the engine, through a separation film, reduce $CO_2$ in the exhaust gas by utilizing $CO_2$ for the reformation of the gas fuel, and improve the thermal efficiency and reduce the generation of NOx by converting the gas fuel into a reformed fuel.

Another object of the present invention is to provide an oxygen eliminating apparatus adapted to eliminating $O_2$ by subjecting $O_2$ in a gas separated from an exhaust gas from an engine to a reaction with C to convert the same into CO and $CO_2$ with the principle that, when $O_2$ flows to carbon C heated to around 600° C. in a natural gas reforming apparatus, C and $O_2$ react with each other to be turned into CO and $CO_2$ utilized, and a gas engine provided with an oxygen eliminating apparatus-carrying natural gas reforming apparatus.

The present invention relates to a natural gas reforming apparatus comprising an exhaust gas pipe in which an exhaust gas discharged from an engine flows, an exhaust gas passage body provided in the exhaust gas pipe and comprising a porous material provided with a honeycomb or passage holes forming an exhaust gas passage, a gas fuel case provided on the outer side of the exhaust gas pipe and having an inlet from which a gas fuel supplied from a gas fuel supply source and containing $CH_4$ as a main component is supplied, and an inlet from which $CO_2$ separated from the exhaust gas is supplied, a porous member provided in the gas fuel case, forming a gas fuel passage and comprising a porous ceramic material, a catalyst applied to a surface of the gas fuel passage-forming porous member, and having an action of converting $CH_4$ and $CO_2$ into a reformed fuel of CO and $H_2$ by thermally decomposing $CH_4$ and $CO_2$ by the thermal energy of the exhaust gas, and a heat insulating material provided on an outer circumferential surface of the gas fuel case.

The catalyst is formed out of Ni or Pt. When the catalyst comprises Ni, Ni steam of 1400°–1500° C. is supplied to a porous member of a porous ceramic material, so that Ni can be evaporated easily on the surfaces of open pores of the porous member.

The heat insulating material comprises a nonwoven cloth of a ceramic material, such as SiC.

The exhaust gas pipe, gas passage body, gas fuel case and porous member are formed out of a ceramic material of either heat resistant $Si_3N_4$ or heat resistant SiC, and they can be formed to an integral structure when occasion demands. The ceramic material constituting the exhaust gas pipe, gas passage body, gas fuel case and porous member preferably contains AlN of a high thermal conductivity.

The exhaust gas pipe forms a partition wall between the exhaust gas passage body of a honeycomb structure in which an exhaust gas flows and the porous member of a porous ceramic material in which a gas fuel flows, and it is formed to a dense ceramic structure.

In this natural gas reforming apparatus, the exhaust gas passage body is formed to a structure having a honeycomb and passage holes, whereby the flow passage resistance of the exhaust passage body is regulated to a low level, and whereby the porous member in which a gas fuel flows is regulated so as to give $CH_4$ a proper period of reformation time, and prevent the natural gas reforming apparatus from taking out more exhaust gas thermal energy than is required for a thermal decomposition operation.

The porous member is provided with a plurality of passage holes extending from the side thereof from which the gas fuel and $CO_2$ are supplied, and a plurality of passage holes extending from the side thereof from which the reformed fuel is discharged.

The inlet opened in the gas fuel case and used to supply a gas fuel containing $CH_4$ as a main component thereinto, and the inlet opened in the gas fuel case and used to supply $CO_2$ separated from an exhaust gas thereinto are formed so as to be opened in a mutually opposed state for the purpose of promoting the mixing of the gas fuel with $CO_2$.

Since the exhaust gas passage body in this natural gas reforming apparatus is formed out of a porous material provided with a honeycomb structure or passage holes as mentioned above, a loss does not occur in a flow of an exhaust gas, and the exhaust gas can be discharged to the downstream side. In the porous member, a gaseous mixture of a gas fuel and $CO_2$ flows smoothly as it contacts a catalyst-coated porous wall surface, the velocity of flow of the gas fuel and $CO_2$ therefore becomes low. This enables a reaction time long enough to carry out a thermal decomposition operation to be secured, and $CH_4$, a main component of the natural gas to be converted into $H_2$ and CO excellently.

The present invention also relates to an oxygen eliminating apparatus for a gas engine provided with an exhaust passage through which an exhaust gas from combustion chambers is discharged, a $CO_2$ supply apparatus provided in the exhaust passage and having a $CO_2$ separation films for separating $CO_2$ from the exhaust gas, and a natural gas reforming apparatus provided in the exhaust passage so as to convert the natural gas into a reformed gas of CO and $H_2$ by thermally decomposing $CH_4$ in the natural gas by the thermal energy of the exhaust gas, and adapted to receive $CO_2$ supplied from the $CO_2$ supply apparatus, the oxygen eliminating apparatus comprising a casing provided in a $CO_2$ passage in which a $CO_2$-containing separated gas which has passed through the $CO_2$ separation films flows, and having an inlet which the separated gas enters and an outlet from which the separated gas is discharged, a porous carbon member supported in the casing via nonconductive supports and adapted to allow the separated gas to pass therethrough, and a power source for electrically heating the porous carbon member for the purpose of subjecting $O_2$ contained in the separated gas to a reaction with the carbon of the porous carbon member and converting the substances into CO and $CO_2$.

This oxygen eliminating apparatus is adapted to detect the quantity of carbon in the porous carbon member on the basis of a detected electrical resistance value, and can give an alarm when the quantity of carbon in the porous carbon member decreases to a level not higher than a predetermined level.

This oxygen eliminating apparatus is formed as described above. Accordingly, when the porous carbon member is heated to around 600° C. by the power source, $O_2$ in the separated gas reacts with carbon while it passes through the porous carbon member to convert the substances into CO and $CO_2$, whereby $O_2$ can be eliminated from the separated gas. When the separated gas does not contain $O_2$, the gas merely passes through the porous carbon member, and no troubles occur.

The carbon is a good conductor of electricity, and, therefore, when the porous carbon member is electrically heated in a heat insulated casing, the temperature of carbon can easily rise to a level at which the carbon reacts with $O_2$. Moreover, the carbon can be formed to a porous structure easily. Accordingly, when the separated gas is passed through a porous body of carbon, $O_2$ contained in the separated gas reacts with heated carbon very effectively, and the substances are turned into gases of CO and $CO_2$. The carbon of the porous carbon member is consumed in the reaction with $O_2$ and decreases, and, when the quantity of carbon becomes not higher than a predetermined level, the porous carbon member or the oxygen eliminating apparatus may be replaced.

This oxygen eliminating apparatus is formed as described above. Therefore, even when $O_2$ is contained in a $CO_2$-containing gas separated from an exhaust gas, the $O_2$ reacts with the carbon of the porous carbon member, and the substances are turned into CO and $CO_2$. Consequently, the separated gas does not contain $O_2$, so that $O_2$ is not sent to the natural gas reforming apparatus. Accordingly, in the natural gas reforming apparatus, $CH_4$, a main component of a natural gas is reformed to $H_2$ and CO but a reaction of these $H_2$ and CO with $O_2$ does not occur, so that explosion does not occur. Therefore, the safety can be secured.

The present invention further relates to a gas engine comprising a gas fuel supply source holding a natural gas fuel containing $CH_4$ as a main component, a natural gas reforming apparatus adapted to convert $CH_4$, which is supplied from the gas fuel supply source, into a reformed fuel by thermally decomposing $CH_4$ by the thermal energy of an exhaust gas from combustion chambers, and provided in an exhaust passage, a turbocharger provided in the portion of the exhaust passage which is on the downstream side of the natural gas reforming apparatus, an apparatus for supplying the reformed fuel to the combustion chambers, a Rankine cycle provided with heat exchangers and installed in the portion of the exhaust passage which is on the downstream side of the turbocharger, and a $CO_2$ supply apparatus provided in the portion of the exhaust passage which is on the downstream side of the Rankine cycle, and adapted to supply $CO_2$, which is separated from the exhaust gas by $CO_2$ separation films, to a gas fuel case of the natural gas reforming apparatus through a $CO_2$ passage.

The Rankine cycle comprises a heat exchanger provided in the exhaust passage, a steam turbine driven by steam occurring in the heat exchanger, a condenser adapted to convert the steam discharged from the steam turbine into water, and another heat exchanger provided in the portion of the exhaust passage which is on the downstream side of the first-mentioned heat exchanger, so as to convert the water from the condenser into steam and supply the steam to the first-mentioned heat exchanger.

The $CO_2$ separation films comprise inorganic separation films formed out of a porous ceramic material, such as alumina, silica and zeolite. These $CO_2$ separation films are formed of films of porous bodies obtained by making fine open pores in a ceramic material, and capable of separating $CO_2$ from an exhaust gas by utilizing the molecular sieving effect thereof since the diameter of, for example, $CO_2$ is smaller than those of $N_2$ and $O_2$. The separation films can be applied effectively to the present invention since the temperature at which they are used is as high as 350° C.

The $CO_2$ which did not contribute to the thermal decomposition of $CH_4$ is supplied with the reformed fuel to the combustion chambers. A mixed gas of $CH_4$, CO, $H_2$ and $CO_2$ is introduced to swirl chambers of the combustion chamber. Therefore, when the control valves are opened to cause the mixed gas in the swirl chambers to be mixed with the compressed air in the primary chambers of the combustion chambers and burned, the generation of NOx due to the existence of $CO_2$ is minimized, and the generation of NOx can be reduced to not more than 100 ppm.

When the combustion chambers in this gas engine are formed to a heat insulating structure by ceramic members, the temperature of an exhaust gas discharged from the combustion chambers is around 900°–800° C. in, for example, a catalyst reactor, and can sufficiently contribute to the thermal decomposition of $CH_4$. The exhaust gas is then recovered by the turbocharger, in which the temperature thereof decreases by around 150° C., and it is thereafter recovered by the first heat exchanger, in which the temperature of the exhaust gas decreases by around 200° C. The exhaust gas is finally recovered by the second heat exchanger, in which the temperature thereof decreases by around 200° C. Accordingly, the exhaust gas the temperature of which has been reduced to around 350°–250° C. comes to be supplied to the $CO_2$ separation films in the $CO_2$ supply apparatus, so that $CO_2$ can be separated from the exhaust gas excellently by the $CO_2$ separation films. Since the $CO_2$ separation films are formed of porous ceramic bodies, they have a high thermal resistance, and, moreover, they are most activated at around 300° C., and separate $CO_2$ from the exhaust gas excellently.

Since this gas engine is formed as described above, $CH_4$, a main component of a natural gas is thermally decomposed in the condition of a high temperature of about 900°–800° C. of the thermal energy of an exhaust gas by mixing $CO_2$ with $CH_4$ and with the help of a catalyst, and the substances are thereby converted into a reformed fuel of CO and $H_2$. Accordingly, the calorific value can be increased by around 38%, and the thermal efficiency of the engine can be improved. This decomposition reaction is a reaction in which thermal decomposition occurs when a mixed gas of $CH_4$ and $CO_2$ is passed over a catalyst of Ni or Pt and heated to not lower than about 800° C., $CO_2$ being converted into carbon monoxide, $CH_4$ being converted into CO and $H_2$. Since the combustion chambers are formed to a heat insulating structure, the exhaust gas from the combustion chamber is put in a high-temperature condition, it comes to have a temperature of not lower than 800° C., whereby the thermal decomposition reaction is smoothly carried out.

In this gas engine, the exhaust gas discharged to the atmospheric air comprises $N_2$ and $H_2O$ since the gas has been passed through $CO_2$ separation film by which $CO_2$ in the gas is removed. Accordingly, the exhaust gas does not cause the atmospheric air to be contaminated, nor does it deteriorate the environment. In this gas engine, the thermal energy of the exhaust gas is recovered by the turbocharger, one heat exchanger and another heat exchanger which are provided in the exhaust passage, after it has contributed to the thermal decomposition of $CH_4$. Namely, in this gas engine, the turbocharger is driven by the thermal energy of the exhaust gas, and steam is generated in the first and second heat exchangers by the exhaust gas discharged from the turbine in the turbocharger, the steam turbine being driven by the steam, whereby the steam can be recovered as electric power by the generator.

When the thermal efficiency of this gas engine based on a diesel cycle is assumed to be 42%, it is improved by about 8% by the generator-carrying turbocharger, and by about 5% by the steam turbine, and the calorific value increases 1.38 times by the decomposition of $CH_4$ into CO and $H_2$. Therefore, when the $CH_4$ decomposition ratio is assumed to be 50%, the attainment of a thermal efficiency of 65.5% of the gas engine as a whole can be expected.

This gas engine is further provided with an oxygen eliminating apparatus installed in the $CO_2$ passage between the $CO_2$ separator provided in the portion of the exhaust passage which is on the downstream side of the Rankine cycle and natural gas reforming apparatus.

When an ordinary engine is driven, it consumes at least a half of $O_2$ in the air sucked thereinto, so that the content of $C_2$ of the exhaust gas from the engine is around 10%. When $CO_2$ is separated from the exhaust gas by a $CO_2$ separator provided in the exhaust passage of the engine, there is the possibility that the $CO_2$-containing separated gas contains around 1% of $O_2$. When the separated gas containing around 1% concentration of $O_2$ is sent to the natural gas reforming apparatus, explosion due to a catalyst does not occur. However, when a $CO_2$-containing separated gas containing around 5% concentration of $O_2$ is sent to the natural gas reforming apparatus, the apparatus is put in a very dangerous condition, i.e., $O_2$ and $H_2$ and CO possibly react with each other to cause explosion to occur.

Since the gas engine according to the present invention is provided with the oxygen eliminating apparatus in the $CO_2$ passage, the carbon of the porous carbon member and $O_2$ contained in the separated gas generate an oxidation reaction, and the $O_2$ concentration in the separated gas decreases to not higher than about 1%, so that explosion does not occur in the natural gas reforming apparatus.

Moreover, when the separated gas contains $O_2$, the quantity of carbon of the porous carbon member in the oxygen eliminating apparatus decreases. Consequently, the electrical resistance value of the porous carbon member increases, and an alarm indicating that $H_2$ and CO and $O_2$ will react with one another to invite danger can be given.

DESCRIPTION OF THE PREFERRED EMBODIMENTS

The embodiments of the natural as reforming apparatus and gas engine provided with the same apparatus will now be described with reference to the drawings.

Figure 1:
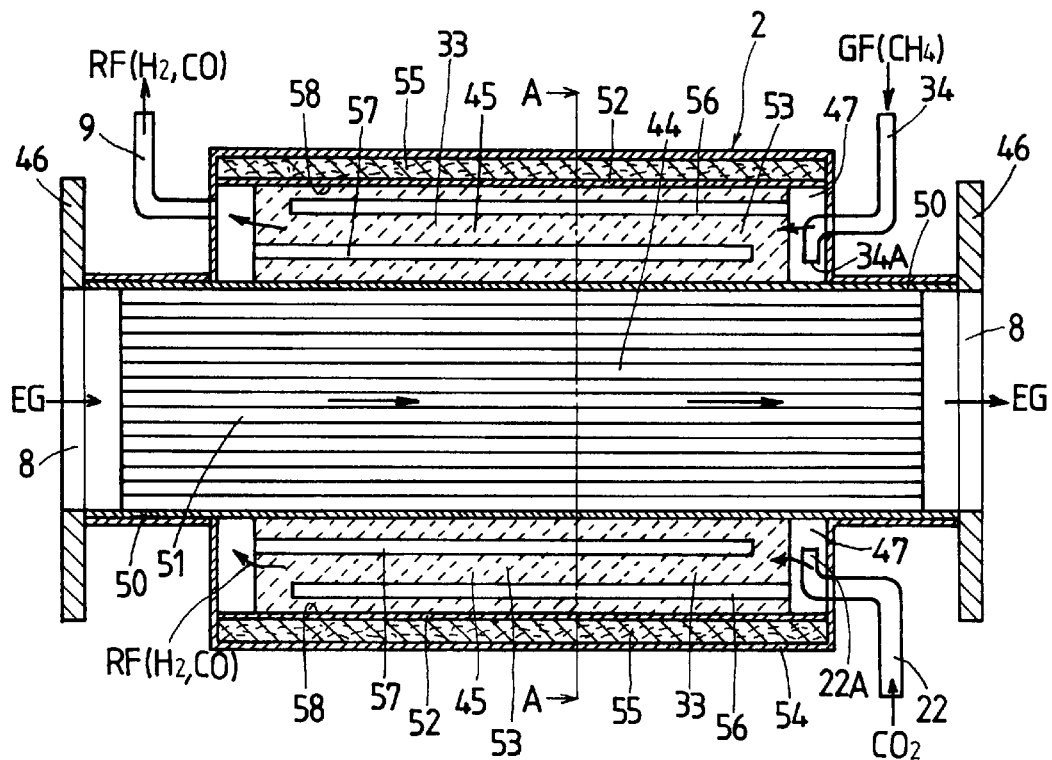
FIG. 1 is a sectional view showing an embodiment of the natural gas reforming apparatus according to the present invention.
Figure 2:
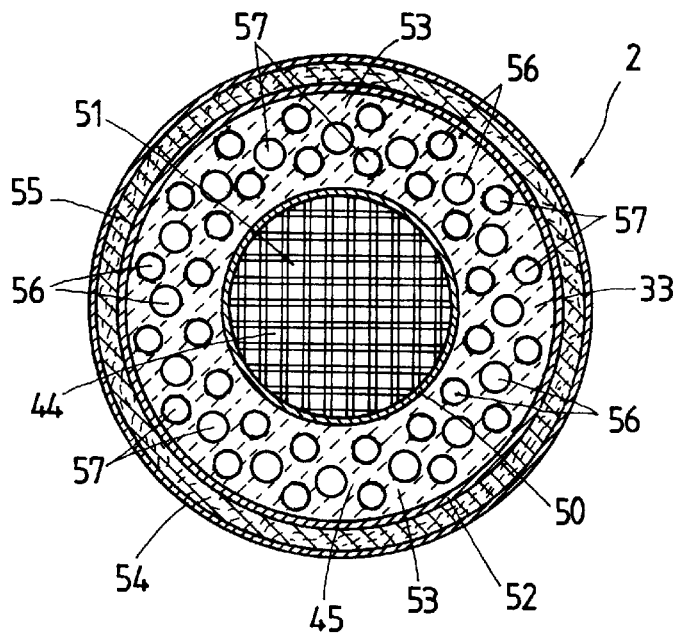
FIG. 2 is a sectional view taken along the line A—A in FIG. 1 of the natural gas reforming apparatus.

An embodiment of the natural gas reforming a apparatus according to the present invention will now be described with reference to FIGS. 1, 2 and 3.

A natural gas reforming apparatus 2 according to the present invention is provided in an exhaust passage 8 in which an exhaust gas EG discharged from an engine 1 flows, and comprises an exhaust gas pipe 50, in which the exhaust gas EG flows, connected to the exhaust passage 8, a gas fuel case 52 provided on the outer side of the exhaust gas pipe 50 and adapted to allow a gas fuel supplied from a gas fuel supply source 11, such as a fuel tank and containing $CH_4$ as a main component and $CO_2$ to flow therein, mounting members 46 provided on both ends of the exhaust gas pipe 50 so as to install the exhaust gas pipe in the exhaust passage 8 of the engine 1, and a heat insulating material 55 packed in a casing 54 provided around an outer circumference of the gas fuel case 52.

The natural gas reforming apparatus 2 comprises an exhaust gas passage body 51 provided in the exhaust gas pipe 50 and formed out of a porous material provided with a honeycomb or passage holes which constitute the exhaust gas passage 44, a porous member 53 provided in the gas fuel case 52 and comprising a porous ceramic material forming a gas fuel passage 45, and a catalyst 33 which is applied to the surface of the porous member 53 forming the gas fuel passage 45, and which has an effect of thermally decomposing $CH_2$ and $CO_2$ by the thermal energy of the exhaust gas EG into a reformed fuel RF of CO and $H_2$. A $CO_2$ passage 22 and a natural gas supply passage 34 are connected to an upstream end portion of the gas fuel case 52, and a reformed fuel supply passage 9 to a downstream end portion thereof.

An inlet 34A into which a gas fuel GF sent from the natural gas fuel supply source through the natural gas supply passage 34 and containing $CH_4$ as a main component is supplied, and an inlet 22A into which $CO_2$ separated from the exhaust gas EG is supplied through the $CO_2$ passage 22 are opened in the gas fuel case 52. The inlet 34A into which the gas fuel GF containing $CH_4$ as a main component is supplied and the inlet 22A into which $CO_2$ separated from the exhaust gas EG is supplied, both of which inlets are opened in the gas fuel case 52, are formed so as to be opposed to each other. On the upstream side of the porous member 53 provided in the gas fuel case 52, a mixing chamber 47 in which $CO_2$ in the separated gas an $CH_4$ in the natural gas can be mixed with each other is formed, so that a mixed gas of $CO_2$ and $CH_4$ comes to pass through the porous member 53.

The catalyst 33 with which the surface of the porous member 53 is coated comprises Ni or Pt. The heat insulating material 55 comprises a nonwoven ceramic cloth of thermally resisting SiC, or $Si_3N_4$, and a heat insulating air layer. The exhaust gas pipe 50, exhaust gas passage body 51, gas fuel case 52 and porous member 53 are formed out of a ceramic material comprising $Si_3N_4$ or SiC which contains AlN having a thermal resistance and a high thermal conductivity.

The exhaust gas pipe 50 forms a partition wall between the exhaust gas passage 44 and gas fuel passage 45. The gas fuel case 52 forms a heat radiation member. The porous member 53 has a plurality of passage holes 56 bored from the side thereof at which the gas fuel GF and $CO_2$ enter, and a plurality of passage holes 57 bored from the side at which the reformed fuel RF flows out. Therefore, the mixed gas of $CO_2$ and $CH_4$ passes smoothly through the porous member 53 from the passage holes 56 to the passage holes 57, and is thermally decomposed into $H_2$ and CO in an excellent manner, so that the thermal energy can be increased.

A gas engine provided with the natural gas reforming apparatus 2 according to the present invention will now be described with reference to FIGS. 3, 4 and 5.

This gas engine uses as a fuel a natural gas containing $CH_4$ as a main component, and can be applied to, for example, a cogeneration system, this gas engine being formed to a swirl chamber type gas engine having primary chambers 1A of the combustion chambers formed in the cylinders, and swirl chambers 1B communicating with the primary chambers 1A via communication ports and formed in a cylinder head 30. The gas engine 1 is provided with an exhaust manifold 39 for discharging an exhaust gas EG from the primary chambers 1A of the combustion chambers, and a suction manifold 40 for supplying suction air to the primary chambers 1A through a suction passage 10. The suction air A from the suction passage 10 is supplied to the primary chambers 1A through the suction manifold 40, and the exhaust gas EG from the primary chambers 1A is discharged from the exhaust manifold 39 to the exhaust passage 8. The reformed gas fuel RF to be supplied to the swirl chambers 1B and obtained by reforming the natural gas is sent to the swirl chambers 1B through the reformed fuel supply passage 9 by an operation of a fuel pressurization pump 13.

The primary chambers 1A and swirl chambers 1B of the combustion chambers in the gas engine 1 are formed to heat insulating structures by ceramic members or heat insulating layers. The swirl chambers 1B are formed so as to communicate with the primary chambers 1A when the communication ports are opened by the control valves 31. The compressed air A from a compressor 16 in a turbocharger 3 is supplied to the primary chambers 1A through the suction passage 10, and reformed fuel RF from a reformed fuel supply passage 9 to the swirl chambers 1B when the fuel supply port is opened by a fuel valve 32.

The gas engine 1 is provided in the exhaust passage 8 with a natural gas reforming apparatus 2 adapted to convert $CH_4$ in a natural gas in the presence of $CO_2$ into a reformed fuel RF of $H_2$ and CO by the thermal energy of the exhaust gas EG discharge from the primary chambers 1A through the exhaust passage 8. The natural gas reforming apparatus 2 can be provided in the portion of the exhaust passage 8 which is in the vicinity of the exhaust manifold 39, or in a collecting pipe of the exhaust manifold when occasion demands, so as to be integral therewith. The turbocharger 3 driven by the exhaust gas EG is provided in the portion of the exhaust passage 8 which is on the downstream side of the natural gas reforming apparatus 2.

The gas engine 1 has a fuel tank 11 holding the natural gas fuel GF, a fuel pressurization pump 13 constituting a reformed fuel supply apparatus adapted to supply the reformed fuel RF to the swirl chambers 1B of combustion chambers, a Rankine cycle 80 provided on the downstream side of the turbocharger 3, and a $CO_2$ supply unit 7 provided on the downstream side of the Rankine cycle 80 and comprising $CO_2$ separation films 37 for separating $CO_2$ from the exhaust gas EG, and a pump 38 for supplying $CO_2$ separated from the exhaust gas EG to the natural gas reforming apparatus 2. The Rankine cycle 80 comprises a heat exchanger 4 provided in the portion of the exhaust passage 8A which is on the downstream side of the turbocharger 3, a steam turbine 5 driven by the steam S discharged from the steam S generated in the heat exchanger 4, a condenser 14 adapted to convert the steam S discharged from the steam turbine 5 into water W, and a heat exchanger 6 provided in the portion of the exhaust passage 8B which is on the downstream side of the heat exchanger 4, and adapted to convert the water W from the condenser 14 into steam S.

In the gas engine 1, the exhaust gas EG discharged from the $CO_2$ supply unit 7 to the atmospheric air has a low $CO_2$ content, and the greater part of the exhaust gas comprises a $N_2$ gas, so that the pollution of the atmospheric air which causes the environment to be deteriorated does not occur. The natural gas reforming apparatus 2 is provided in the portion of the exhaust passage 8 which communicates with a collecting portion of the exhaust manifold 39. The primary chambers 1A and swirl chambers 1B are formed to heat insulating structures by ceramic members and heat insulating layers. Therefore, the exhaust gas EG discharged through the exhaust manifold 39 is a high-temperature gas of about 900°–800° C., which is high enough to thermally decompose the $CH_4$-containing gas fuel GN and turn the same into a $H_2$ and CO-containing reformed fuel RF.

When the high-temperature exhaust gas EG from the primary chambers 1A flows in the exhaust gas passage in the natural gas reforming apparatus 2, the gas fuel passage in which the catalyst of Ni or Pt is packed is heated. Consequently, the mixed gas of $CH_4$ and $CO_2$ flowing in the gas fuel passage heated to a high temperature of not lower that about 800° C. contacts the catalyst 33, and $CH_4$ is thermally decomposed into CO and $H_2$, with $CO_2$ into CO, whereby the mixed gas is converted into a reformed fuel RF of CO and $H_2$. The reformed fuel Rf converted from the natural gas is then supplied from the suction manifold 40 to the swirl chambers 1B through the reformed fuel supply passages 9 by the fuel pressurization pump 13.

In this gas engine 1, the thermal energy of the exhaust gas EG is utilized for a thermal decomposition operation in the natural gas reforming apparatus 2, and then recovered by the turbocharger 3 and heat exchangers 4 and 6. In an exhaust gas passage 8A which is on the downstream side of the turbocharger 3 and on the upstream side of the heat exchanger 4, a fuel nozzle 24 for injecting the reformed fuel RF from the natural gas reforming apparatus thereinto is provided. The supplying of the reformed fuel RF from the natural gas reforming apparatus 2 to the fuel nozzle 24 is done through an auxiliary fuel supply passage 23.

Figure 4:
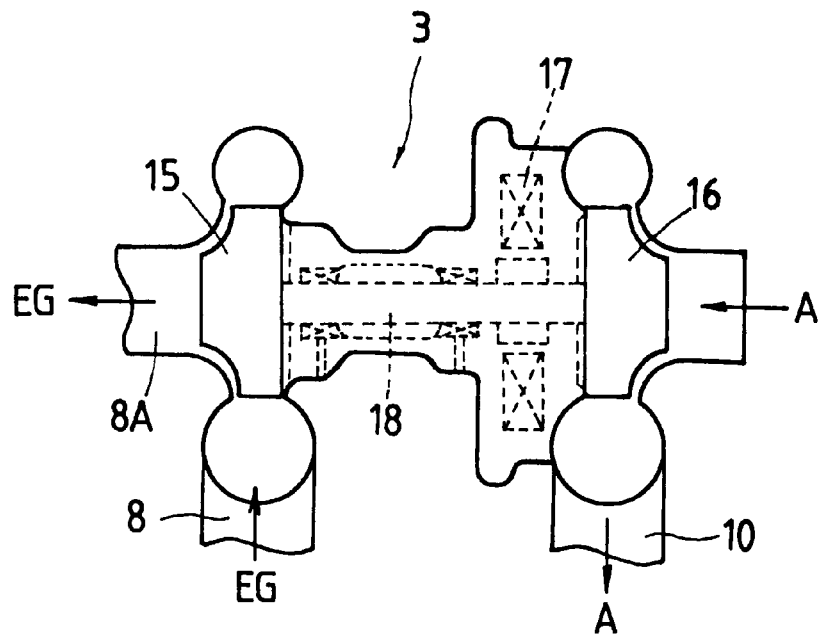
FIG. 4 is an explanatory view showing a generator-carrying turbocharger incorporated in the gas engine of FIG. 3.

As shown in FIG. 4, the turbocharger 3 comprises a turbine driven by the exhaust gas EG, a compressor 16 connected to the turbine 15 by a shaft 18 and driven by the turbine 15, and an AC machine, i.e. a generator 17 mounted on the shaft 18. The compressor 16 is driven by the turbine 15, and pressurizes the air A to produce compressed air A, which is supplied from the suction manifold 40 to the primary chambers 1A in the cylinders through the suction passage 10. The generator 17 is capable of taking out the rotational force of the turbine 15 as electric power and recovering the energy of the exhaust gas as electric energy.

The heat exchanger 4 comprises the steam passage 35 provided therein with a porous ceramic member through which low-temperature steam S heated in the heat exchanger 6 flows, and an exhaust gas passage 28 provided therein with a porous ceramic member, which is identical with the porous ceramic member in the steam passage 35, through which the exhaust gas EG flows. The heat exchanger 6 comprises a water-steam passage provided therein with a porous ceramic member through which the steam S flows, and capable of storing water W, and an exhaust gas passage 29 formed around the water-steam passage 36 and provided therein with a porous ceramic member through which the exhaust gas EG from the heat exchanger 4 flows.

Figure 5:
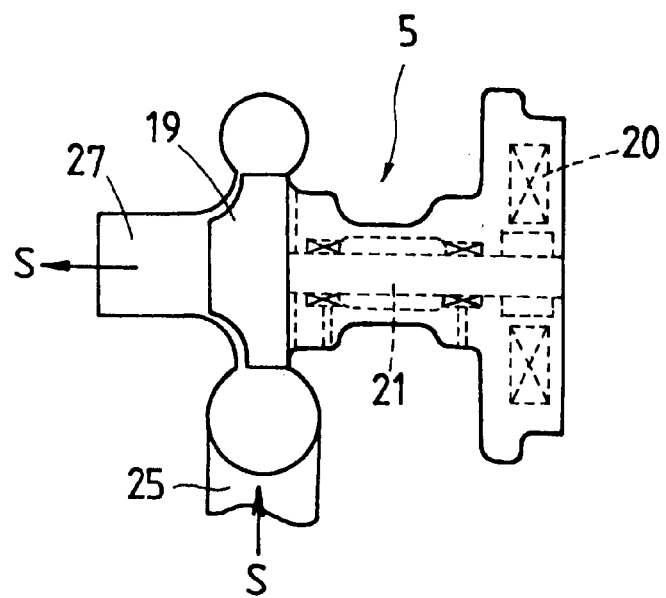
FIG. 5 is an explanatory view of a steam turbine incorporated in the gas engine of FIG. 3.

As shown in FIG. 5, the turbine 5 comprises a turbine 19 driven by the high-temperature steam S generated in the heat exchanger 4, and a generator 20 mounted on a shaft 21. Accordingly, the steam energy drives the turbine 19, and the rotational force thereof is recovered as electric force by the generator 20. The heat exchanger 6 provided in the exhaust passage 8B is a gas-liquid phase heat exchanger, and adapted to generate steam S by the energy of the exhaust gas, the steam S being sent to the heat exchanger 4 through a steam passage 41. The steam S which has driven the steam turbine 5 turns into a fluid mixed with the low-temperature steam S (water-containing steam), the fluid being discharged to the condenser 14 through a fluid passage 27. The fluid turns into high-temperature water W in the condenser 14, and sent to the heat exchanger 6 through a water passage 26 by a water pump 12. The exhaust gas EG which has passed through the heat exchanger 6 turns into a low-temperature exhaust gas EG (of around, for example, 200° C.) the thermal energy of which has almost been recovered, this exhaust gas being sent to the $CO_2$ supply unit 7.

The $CO_2$ supply unit 7 comprises a $CO_2$ supply unit 7 provided with a plurality of rod type $CO_2$ separation films 37 and installed, for example, in an exhaust passage 8C in which the low-temperature exhaust gas EG flows. The exhaust gas EG sent from the exhaust passage 8C to the $CO_2$ supply unit 7 passes through the $CO_2$ separation films 37, where $CO_2$ is separated from the exhaust gas EG, and $N_2$, $O_2$, and $H_2O$ gases which cannot pass through the $CO_2$ separation films 37 bypass the separation films 37 to be discharged to an exhaust passage 8D. The separated $CO_2$ is supplied to the natural gas reforming apparatus 2 through a $CO_2$ passage 22 by an operation of a $CO_2$ supply pump 38.

The $CO_2$ separation films 37 held in the $CO_2$ supply unit 7 are porous ceramic bodies formed of separation films comprising a porous ceramic material of alumina, silica or zeolite. These separation films are a kind of filtration films, which do not permit $N_2$ and $O_2$ the molecular diameters of which are large and $H_2O$ (steam) to pass therethrough, and which permit $CO_2$ the molecular diameter of which is small to pass therethrough, and $CO_2$ to be sent to the natural gas reforming apparatus 2 through the $CO_2$ passage 22 by an operation of the $CO_2$ suction and supply pump 38.

The $N_2$ and $H_2O$ gas (steam) which could not pass through the $CO_2$ separation films 37 in the $CO_2$ supply unit 7 are discharged from an exhaust passage 8D to the atmospheric air. The exhaust passage 8D is provided with, for example, a pressure regulating valve 42, by which the pressure of the exhaust gas EG to be discharged to the atmospheric air is regulated, whereby the quantity of $CO_2$ taken into the $CO_2$ supply pump 38 through the $CO_2$ separation films 37 in the $CO_2$ supply unit 7 is regulated.

This gas engine is formed as described above, and operated as follows. When the suction valve is opened with the control valve 31 closed, the air A from the compressor 16 in the turbocharger 3 is supplied from the suction manifold 40 to the primary chambers 1A through the suction passage 10. The air A in the primary chamber 1A is compressed in a compression stroke with the control valve 31 closed. On the other hand, the natural gas fuel GF is supplied from the fuel tank 11 to the natural gas reforming apparatus 2 through the natural gas fuel supply passage 34, and converted into a reformed fuel RF, and the fuel valves 32 are opened with the control valve 31 closed, the fuel pressurization pump 13 being operated, so that the reformed fuel RF is supplied from the natural gas reforming apparatus 2 to the swirl chambers 1B through the reformed fuel supply passages 9. The control valve 31 is opened when the piston is in the vicinity of an upper dead center of a compression stroke, and the compressed air A in the primary chambers 1A flows into the swirl chambers 1B, and the reformed fuel RF is mixed with the compressed air A, the resultant gaseous mixture being ignited and burnt, the combustion gas being ejected from the swirl chambers 1B into the primary chambers 1A, the combustion in the primary chambers 1A being thereby promoted to cause the compression stroke to be transferred to an expansion stroke, whereby the combustion gas makes the pistons 43 work.

In an exhaust stroke, the exhaust gas EG in the primary and swirl chambers 1A, 1B is discharged through the exhaust passage 8. When the high-temperature exhaust gas EG passes through the natural gas reforming apparatus 2, the natural gas is thermally decomposed by the thermal energy thereof into the reformed fuel RF, which is sent out to the turbocharger 3. In the turbocharger 3, the gas drives the turbine 15, the rotational force of which is converted into electric energy by the generator 17 and drives the compressor 16. The electric power obtained by the generator 17 is accumulated in a battery and consumed to drive accessories. The compressor 16 fulfils the function of supplying the air A to the combustion chambers through the suction passage 10. The exhaust gas EG which has passed through the turbine 15 in the turbocharger 3 is sent to the heat exchanger 4 through the exhaust passage 8A, and the thermal energy is recovered by the Rankine cycle 80.

The exhaust passage 8A is provided therein with the fuel nozzle 24, which is adapted to inject a part of the reformed fuel RF sent from the natural gas reforming apparatus 2 thereto through the auxiliary fuel supply passage 23 into the exhaust passage 8A. Since the exhaust gas EG flowing in the exhaust passage 8A contains a large quantity of $O_2$, the reformed fuel RF injected from the fuel nozzle 24 is ignited and burnt to increase the enthalpy of the exhaust gas. The exhaust gas EG sent to the heat exchanger 4 in the Rankine cycle 80 passes through the exhaust gas passage 28, and is then sent to the heat exchanger 6 through the exhaust passage 8B. When the exhaust gas EG passes through the exhaust gas passage 28, it is subjected to heat exchange with the steam sent from the heat exchanger 6 to the steam passage 35 through the steam passage 41, and thereby heated to a high temperature.

The steam heated to a high temperature in the heat exchanger 4 is sent to the steam turbine 5 through the high-temperature steam passage 25 to drive the turbine 19. Owing to the operation of the turbine 19, the generator 20 produces power. The high-temperature steam which has driven the steam turbine 5 is converted into a fluid comprising low-temperature steam or water, which is sent to the condenser 14 through the fluid passage 27 and turned into water, which is sent to the water-steam passage 36 through the water passage 26 by the driven water pump 12.

The exhaust gas EG sent from the heat exchanger 4 to the heat exchanger 6 is discharged to the exhaust passage 8C through the exhaust gas passage 29. When the exhaust gas EG passes through the exhaust gas passage 29, it is subjected to heat exchange with the water flowing in the water-steam passage 36 to convert the water into steam. The thermal energy of the exhaust gas EG sent out to the exhaust passage 8C is recovered by the natural gas reforming apparatus 2, turbocharger 3 and heat exchangers 4, 6, and the temperature of the gas EG decreases to as low as, for example, around 200° C. Accordingly, even when the exhaust gas EG is sent out to the $CO_2$ supply unit 7, the $CO_2$ separation films 37 are not damaged. The exhaust gas EG sent to the $CO_2$ supply unit 7 passes through the $CO_2$ separation films 37 to separate $CO_2$ therefrom. The separated $CO_2$ is sent from the $CO_2$ supply unit 7 to the natural gas reforming apparatus 2 through the $CO_2$ passage 22 by an operation of the $CO_2$ supply pump 38. The exhaust gas EG, from which $CO_2$ was separated when the gas passed through the $CO_2$ separation films 37, comprises $CO_2$ content-reduced $N_2$ and $H_2O$, and is discharged from the exhaust passage 8D to the atmospheric air.

Figure 6:
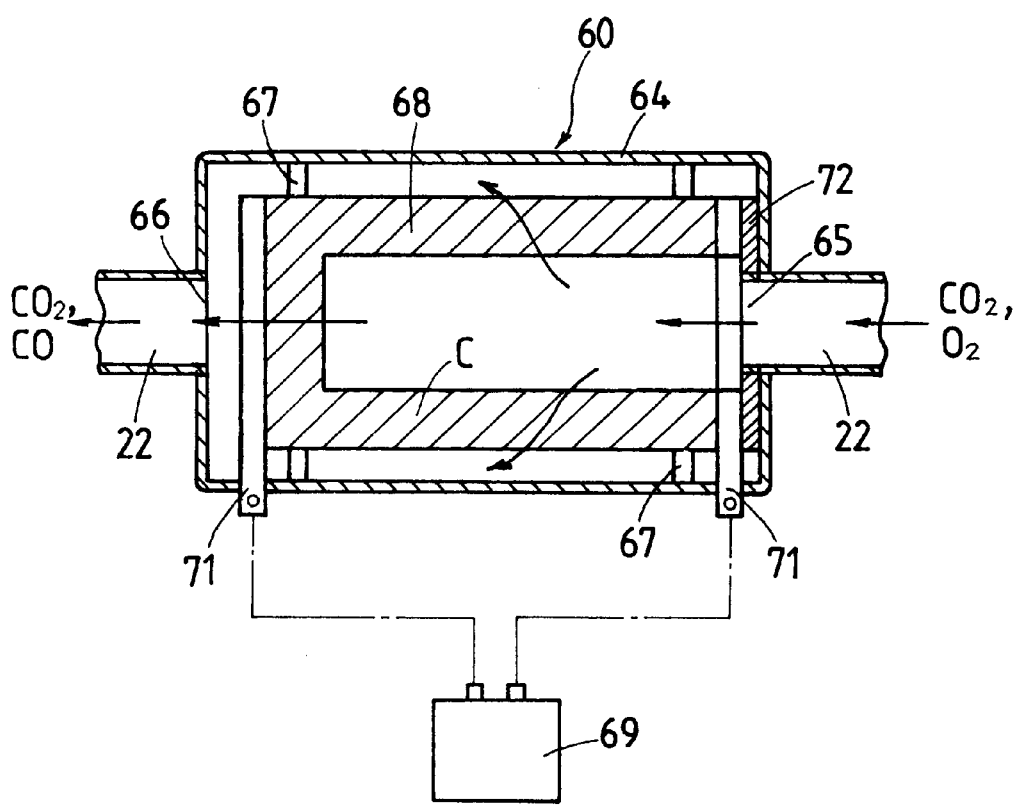
FIG. 6 is a sectional view showing an embodiment of the oxygen eliminating apparatus in the natural gas reforming apparatus according to the present invention.

A second embodiment of the gas engine provided with the same oxygen eliminating apparatus as in the natural gas reforming apparatus 62 according to the present invention will now be described with reference to FIGS. 6 and 7.

Figure 3:
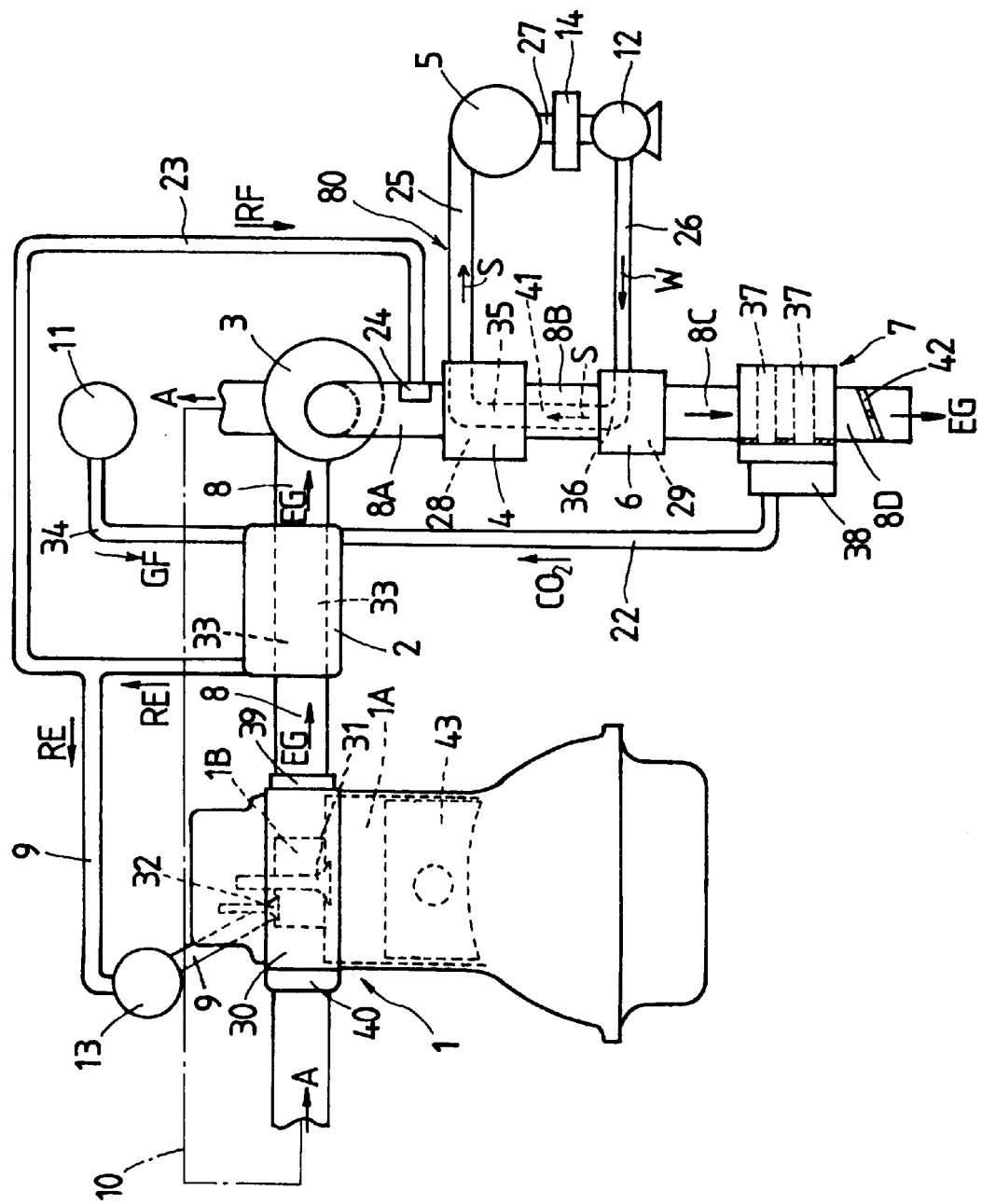
FIG. 3 is an explanatory view showing an embodiment of the gas engine provided with the natural gas reforming apparatus according to the present invention.
Figure 7:
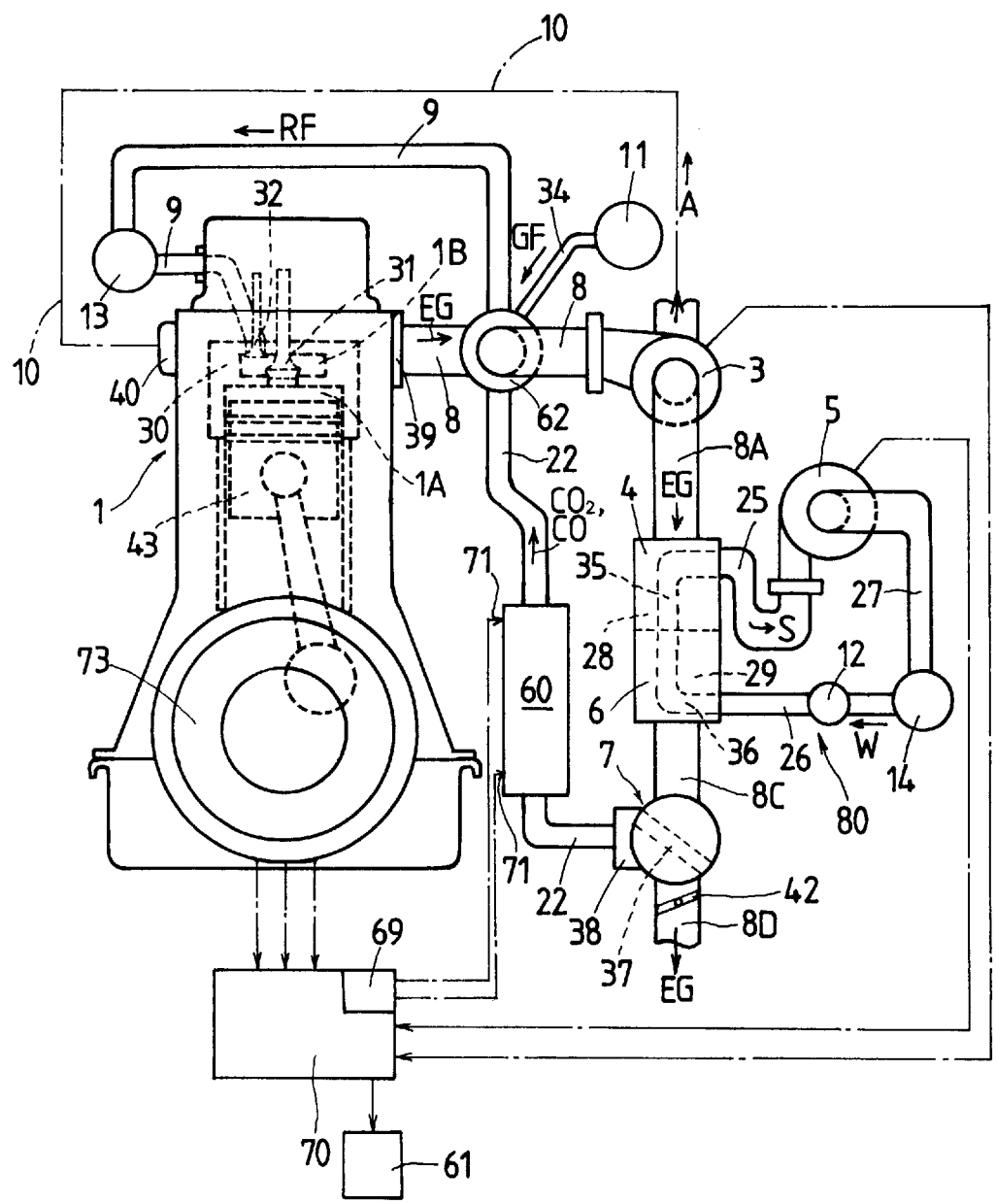
FIG. 7 is an explanatory view showing an embodiment of the gas engine provided with the oxygen eliminating apparatus-carrying natural gas reforming apparatus according to the present invention.

The gas engine shown in FIG. 7 has substantially the same construction as that shown in FIG. 3, except that an oxygen eliminating apparatus 60 is provided. Therefore, the same parts are designated by the same reference numerals, and the duplication of descriptions thereof is omitted. Since the natural gas reforming apparatus 62 has substantially the same construction as that 2 shown in FIGS. 1 and 2, a detailed description thereof is omitted.

The gas engine 1 is suitable to be applied to a cogeneration system, and provided on an output shaft with a generator 73 for converting the rotational force of the engine into electric power.

In this embodiment, an exhaust gas EG is basically separated into $CO_2$ and other gases by a $CO_2$ separation film 37 which constitutes a $CO_2$ supply unit 7. However, when the $CO_2$ separation films 37 are imperfect or damaged or not capable of separating gases perfectly, $O_2$ passes through the $CO_2$ separation film and is mixed in $CO_2$ in some cases. When $O_2$-mixed $CO_2$ is sent to the natural gas reforming apparatus 62, the thermal decomposition of $CH_4$ cannot be done excellently, and a danger of explosion arises. Therefore, in order to completely remove $O_2$ from $CO_2$ to be sent to the natural gas reforming apparatus 62 in this gas engine, the oxygen eliminating apparatus 60 is provided between the $CO_2$ supply unit 7 and natural gas reforming apparatus 62.

As shown in FIG. 7, the oxygen eliminating apparatus 60 is provided in the $CO_2$ passage 22 which communicates the $CO_2$ supply unit 7 and natural gas reforming apparatus 62 with each other, so as to apply $CO_2$ which has been separated from the exhaust gas EG by the $CO_2$ supply unit 7 provided in the exhaust passage 8, in which the exhaust gas EG discharged from the engine 1 flows, to the natural gas reforming apparatus 62 adapted to convert $CH_4$-containing gas fuel GF into reformed fuel RF by using such $CO_2$.

The oxygen eliminating apparatus 60 is provided in the $CO_2$ passage 22 in which a separated gas containing mainly $CO_2$ which has passed through the $CO_2$ supply unit 7 flows, and comprises a casing 64 having an inlet 65 into which a separated gas flows, and an outlet 66 from which the separated gas flows out, a porous carbon member 68 supported in the casing via nonconductive supports 67 and allowing the separated gas to pass therethrough, and a power source 69 for heating the porous carbon member 68 so as to generate a reaction between $O_2$ in the separated gas and the carbon in the porous carbon member 68 and convert the same into CO and $CO_2$. The power source 69 is formed so as to electrically heat the porous carbon member 68 through terminals 71. In order to provide the porous carbon member 68 in a sealed state in the casing 64, a seal member 72 is provided.

In the oxygen eliminating apparatus 60, the $CO_2$-containing gas separated from the exhaust gas EG is supplied to the porous carbon member 68 electrically heated by the power source 69. Consequently, the carbon of the porous carbon member 68 and $O_2$ contained in the separated gas react with each other, and are turned into CO and $CO_2$, the quantity of carbon of the porous carbon member 68 decreases accordingly. In this oxygen eliminating apparatus 60 in which the porous carbon member 68 is electrically heated by the power source 69, an electric resistance value varies in accordance with the quantity of carbon. Therefore, the controller 70 is formed so as to detect the electric resistance value of the porous carbon member 68 by a sensor, judge the quantity of carbon in the porous carbon member 68 on the basis of the electric resistance value, and give an alarm from an alarm means 61 when the quantity of carbon of the porous carbon member 68 has decreased to not higher than a predetermined level. When the quantity of carbon of the porous carbon member decreases to a low level, the carbon member may be replaced.

The $CO_2$ supply unit 7 is provided in, for example, the exhaust passage 8C in which a low-temperature exhaust gas EG flows, and formed with a plurality of rod type $CO_2$ separation films 37 held therein. The $CO_2$ in the exhaust gas EG sent from the exhaust passage 8C to the $CO_2$ supply unit 7 is separated from the same gas and discharged from the same $CO_2$ supply unit, and $N_2$, $O_2$ and $H_2O$ which cannot pass through the $CO_2$ separation films bypass the $CO_2$ supply unit 7 and are discharged to the exhaust passage 8D. The $CO_2$-containing gas separated from the exhaust gas EG in the $CO_2$ supply unit 7 is sent to the oxygen eliminating apparatus 60 so as to completely remove $O_2$ through the $CO_2$ passage 22 by an operation of the $CO_2$ supply pump 38. The $O_2$ contained in the separated gas sent to the oxygen eliminating apparatus 60 is oxidized with C and removed to be turned into CO and $CO_2$, which are supplied to the natural gas reforming apparatus 62. The $CO_2$ in the separated gas from the $CO_2$ supply unit 7 passes as it is through the oxygen eliminating apparatus 60, and is supplied to the natural gas reforming apparatus 62.

What is claimed is:

1. A natural gas reforming apparatus comprising an exhaust gas pipe in which an exhaust gas discharged from an engine flows, an exhaust gas passage body provided in said exhaust gas pipe and comprising a porous material provided with a honeycomb or passage holes forming an exhaust gas passage, a gas fuel case provided on the outer side of said exhaust gas pipe and having an inlet from which a gas fuel supplied from a gas fuel supply source and containing $CH_4$ as a main component is supplied, and an inlet from which $CO_2$ separated from the exhaust gas is supplied, a porous member provided in said gas fuel case, forming a gas fuel passage and comprising a porous ceramic material, a catalyst applied to a surface of said gas fuel passage-forming porous member, and having an action of converting $CH_4$ and $CO_2$ into a reformed fuel of CO and $H_2$ by thermally decomposing $CH_4$ and $CO_2$ by the thermal energy of the exhaust gas, and a heat insulating material provided on an outer circumferential surface of said gas fuel case.

2. A natural gas reforming apparatus according to claim 1, wherein said catalyst comprises Ni or Pt.

3. A natural gas reforming apparatus according to claim 1, wherein said heat insulating material comprising a nonwoven ceramic cloth.

4. A natural gas reforming apparatus according to claim 1, wherein said exhaust gas pipe, said gas passage body, said gas fuel case and said porous member are formed out of a ceramic material of either heat resisting $Si_3N_4$ or SiC.

5. A natural gas reforming apparatus according to claim 4, wherein said ceramic material constituting said exhaust gas pipe, said gas passage body, said gas fuel case and said porous member contains AlN of a high heat conductivity.

6. A natural gas reforming apparatus according to claim 1, wherein said porous member is provided with a plurality of passage holes extending from the side thereof from which a gas fuel and $CO_2$ are supplied, and a plurality of passage holes extending from the side thereof from which a reformed fuel is discharged.

7. A natural gas reforming apparatus according to claim 1, wherein said inlet opened in said gas fuel case and used to supply a gas fuel containing $CH_4$ as a main component thereinto, and said inlet opened in said gas fuel case and used to supply $CO_2$ separated from an exhaust gas thereinto are formed so as to be opened in a mutually opposed state for the purpose of promoting the mixing of said gas fuel with said $CO_2$.

8. An oxygen eliminating apparatus for a gas engine provided with an exhaust passage through which an exhaust gas from combustion chambers is discharged, a $CO_2$ supply apparatus provided in said exhaust passage and having a $CO_2$ separation film for separating $CO_2$ from said exhaust gas, and a natural gas reforming apparatus provided in said exhaust passage so as to convert a natural gas into a reformed gas of CO and $H_2$ by thermally decomposing $CH_4$ in said natural gas by the thermal energy of said exhaust gas, and adapted to receive $CO_2$ from the $CO_2$ supply apparatus, said oxygen eliminating apparatus comprising a casing provided in a $CO_2$ passage in which a $CO_2$-containing separated gas which has passed through the $CO_2$ supply apparatus flows, and having an inlet which said separated gas said separated gas enters and an outlet from which said separated gas is discharged, a porous carbon member supported in said casing via nonconductive supports and adapted to allow said separated gas to pass therethrough, and a power source for electrically heating said porous carbon member for the purpose of subjecting $O_2$ contained in said separated gas to a reaction with the carbon of said porous carbon member and converting said substances into CO and $CO_2$.

9. An oxygen eliminating apparatus according to claim 8, wherein the quantity of carbon in said porous carbon member is detected on the basis of an electrical resistance value determined of said carbon member, an alarm being given in accordance with the detection of a decrease in the quantity of carbon in said porous carbon member to a level not higher than a predetermined level.

10. A gas engine comprising a gas fuel supply source holding a natural gas fuel containing $CH_4$ as a main component, a natural gas reforming apparatus adapted to convert $CH_4$, which is supplied from said gas fuel supply source, into a reformed fuel by thermally decomposing $CH_4$ by the thermal energy of an exhaust gas from combustion chambers, and provided in an exhaust passage, a turbocharger provided in the portion of said exhaust passage which is on the downstream side of said natural gas reforming apparatus, an apparatus for supplying said reformed fuel to said combustion chambers, a Rankine cycle provided with heat exchangers and installed in the portion of said exhaust passage which is on the downstream side of said turbocharger, and a $CO_2$ supply apparatus provided in the portion of said exhaust passage which is on the downstream side of said Rankine cycle, and adapted to supply $CO_2$, which is separated from said exhaust gas by $CO_2$ separation films to a gas fuel case of said natural gas reforming apparatus through a $CO_2$ passage.

11. A gas engine according to claim 10, wherein said Rankine cycle comprises first and second heat exchangers provided in said exhaust passage, a steam turbine driven by steam occurring in said first heat exchanger, a condenser adapted to convert the steam discharged from said steam turbine into water, and a second heat exchanger provided in the portion of said exhaust passage which is on the downstream side of said first heat exchanger, so as to convert the water from said condenser into steam and supply said steam to said first heat exchanger.

12. A gas engine according to claim 10, wherein said $CO_2$ separation films comprise inorganic separation films formed out of a porous ceramic material, such as alumina, silica and zeolite.

13. A gas engine according to claim 10, wherein said engine is provided with an oxygen eliminating apparatus installed in the portion of said $CO_2$ passage which is between said $CO_2$ separation films provided in the portion of said exhaust passage which is on the downstream side of said Rankine cycle, and said natural gas reforming apparatus.

* * * * *